Jan. 24, 1967  J. P. CASTELLANA  3,299,734
CANE TYPE HAND BRAKE
Filed June 1, 1964  2 Sheets-Sheet 1
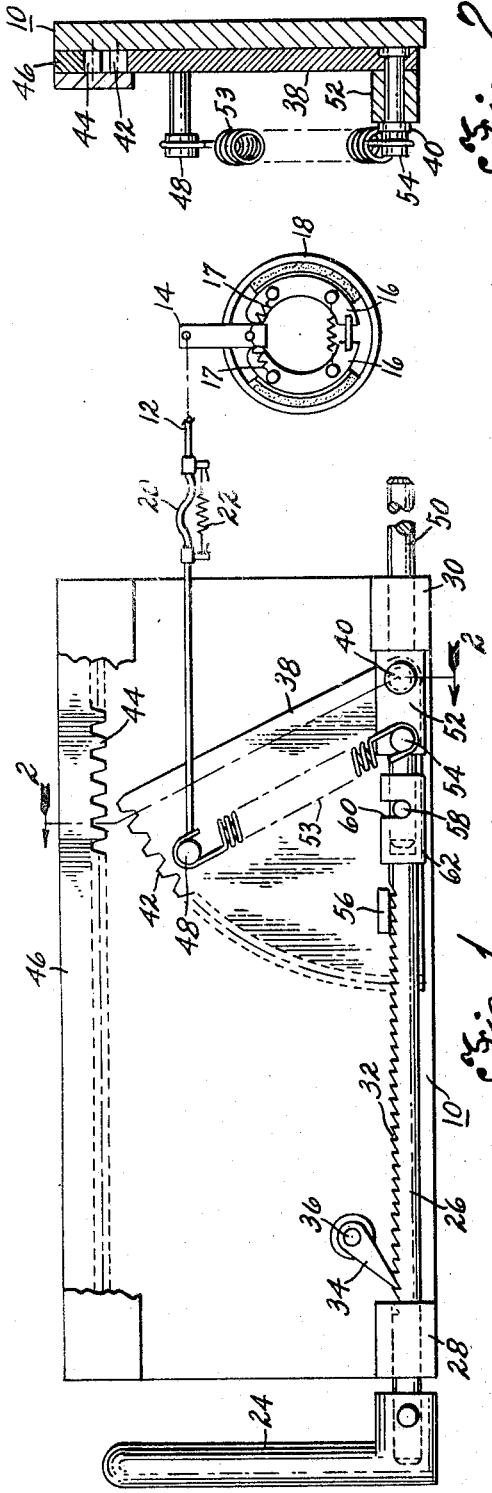
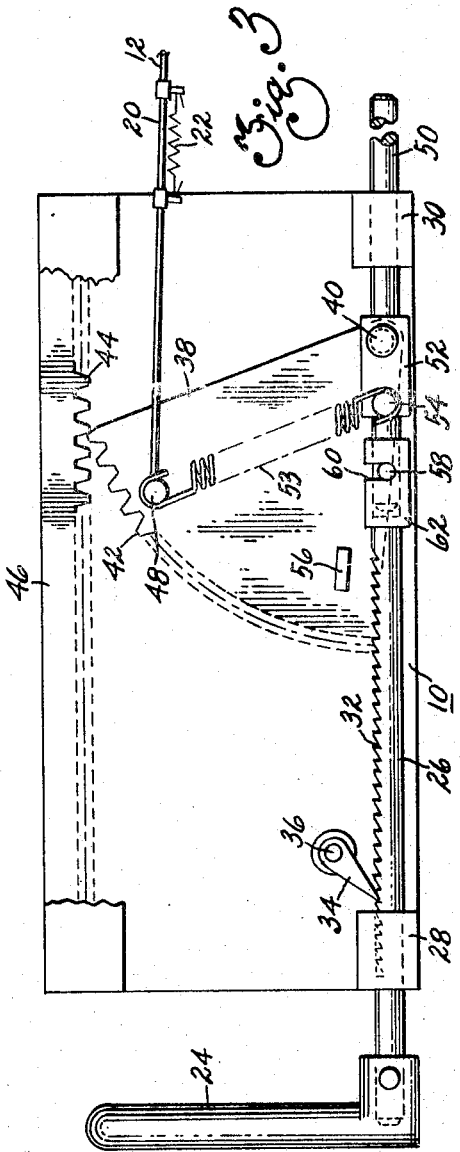
INVENTOR.
JACK P. CASTELLANA
BY O. D. McGraw
HIS ATTORNEY Jan. 24, 1967    J. P. CASTELLANA    3,299,734
CANE TYPE HAND BRAKE
Filed June 1, 1964    2 Sheets-Sheet 2
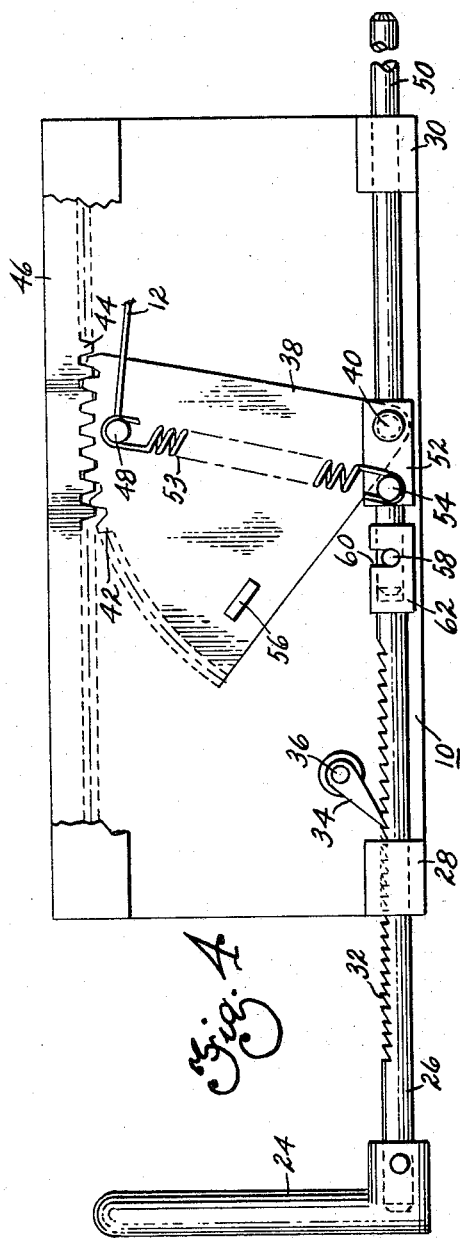
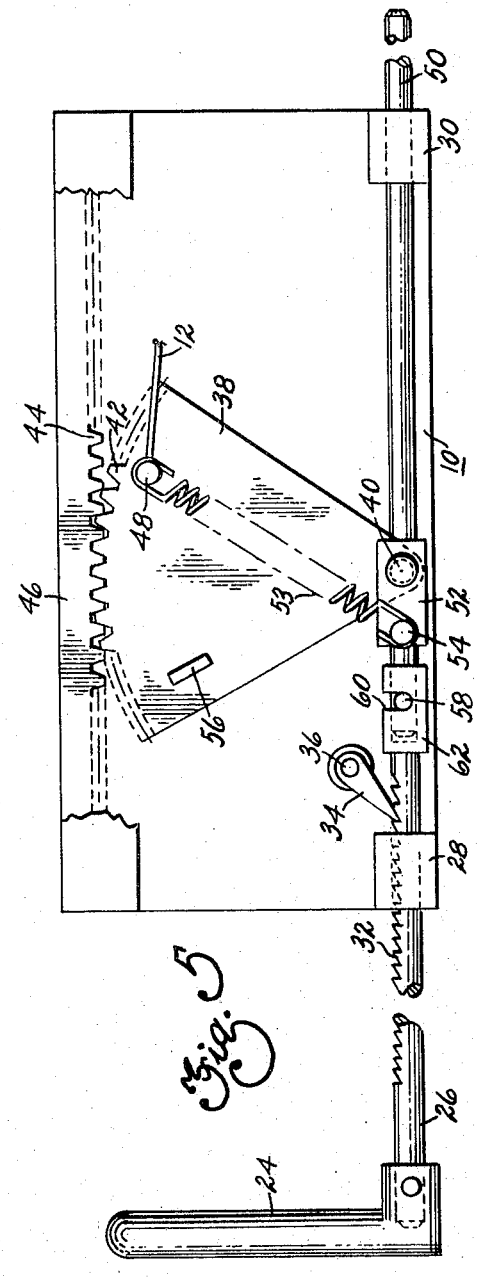
INVENTOR.
JACK P. CASTELLANA
BY D. D. McGraw
HIS ATTORNEY United States Patent Office 3,299,734
Patented Jan. 24, 1967

3,299,734
CANE TYPE HAND BRAKE
Jack P. Castellana, Churchville, N.Y., assignor to General Motors Corporation, Detroit, Mich., a corporation of Delaware
Filed June 1, 1964, Ser. No. 371,445
6 Claims. (Cl. 74—503)

This invention relates to hand-operated parking brakes and more particularly to a type of hand-operated parking brake that utilizes a mechanism developing an increased mechanical advantage for hand operation.

Hand-operated parking brakes found on vehicles of present day design generally employ either a one-to-one mechanical advantage in their operation or some fixed increased mechanical advantage. In the operation of parking brakes, the initial movement of the handle takes up slack in the cable extending to the brakes to be actuated. This slack exists in a cable to allow the normal hydraulic operation of the brakes while the parking brake is in the disengaged position. Therefore, as a parking brake handle is pulled, the initial movement of the handle is used to take up the slack or lost motion in the cable and a certain amount of further movement is used to lever a series of brake shoes or one brake shoe into engagement with a rotatable drum against the tension of the return springs. This initial taking up of lost motion requires very little pressure on the handle and, therefore, an increased mechanical advantage during this period of operation is unnecessary. However, after this initial lost motion is taken up, the brake shoes engage the rotatable drum and, in order to generate a braking action, greater pressure is required. It would be desirable in the operation of hand-operated parking brakes to have an increased mechanical advantage during the period of time when pressure is actually being put on the drums but lesser mechanical advantage while the lost motion in the system is being taken up. The reason for this is that the ratio of pull distance on the lever is directly proportional to the mechanical advantage created. It is therefore clearly seen that, if an increased mechanical advantage is utilized to take up the slack and to move the brake shoes into contact with the drum, a great amount of handle pull distance is required. Depending on the amount of adjustment needed between the brake shoes and the drum, this distance could be prohibitive in the close quarters of the driving compartment of a vehicle.

It is an object of the present invention to provide an improved hand-operated vehicle parking brake that utilizes direct force transmission during the taking up of the lost motion in the system and will provide an increasing mechanical advantage for putting pressure on components of the braking system.

It is another object of the present invention to provide an improved hand-operated vehicle parking brake that requires a minimum amount of handle movement in the driving compartment in order to energize the vehicle brakes.

It is still another object of the present invention to provide an improved hand-operated vehicle parking brake that utilizes a sector gear in order to gain an increased mechanical advantage during brake actuation and thereby takes advantage of the stability of a system using a sector gear.

It is a further object of the present invention to provide an improved hand-operated vehicle parking brake that utilizes a direct force transmission during the initial movement of the braking mechanism and utilizes an increasing mechanical advantage during the time when the shoes are actually being pressured against a rotatable brake drum.

It is still a further object of the present invention to provide an improved hand-operated vehicle parking brake which is compatible with the design of present day automobiles and vehicle braking systems and which can be accessibly positioned in the driving compartment for a vehicle operator.

It is a further object of the present invention to provide an improved hand-operated vehicle parking brake which utilizes a sector gear and a rack arrangement in order to provide a very positively acting vehicle parking brake which can be utilized practically as an emergency brake when greater pressure than used in parking is required to be put on the system parts.

It is yet a further object of the present invention to provide an improved vehicle parking brake that is adapted to absorb an extreme amount of hand pressure put on the parking brake without causing the distortion or destruction of parts in the parking brake mechanism.

Further objects and advantages of the present invention will be apparent from the following description, reference being had to the accompanying drawings wherein a preferred embodiment of the present invention is clearly shown.

In the drawings:

FIGURE 1 is an elevational view of the subject invention diagrammatically illustrated as engaging a vehicle wheel brake;

FIGURE 2 is a sectional view of the subject invention taken along line 2—2 of FIGURE 1;

FIGURE 3 is an elevational view of the subject invention shown with the amount of movement necessary to take up the slack in the cable to the wheel brakes;

FIGURE 4 is a sectional view of the subject invention with the sector gear and rack shown in a position they assume when a maximum mechanical advantage is being utilized in the actuation of the parking brake;

FIGURE 5 is a sectional view of the subject invention with the sector gear and rack shown in the relative position they assume when greater pressure than necessary to operate the parking brake has been placed on the system.

Referring now to FIGURE 1, a vehicle hand-operated parking brake actuating mechanism, generally designated by the numeral 10, is illustrated as being connected by means of a cable 12 to a suitable lever mechanism 14 which is utilized to spread the brake shoes 16 apart and into engagement with a rotatable drum 18. A cable section 20 illustrates the slack in the cable 12 that is necessary in order to provide the space for movement of the cable during hydraulic operation of the brakes 16. Return springs 17 normally bias the brake shoes 16 away from the drum 18. A spring 22 is shown with its ends disposed on either side of the slack area in order to maintain a tautness in the cable during periods of time when the parking brake is not actuated. It is obvious that, when pressure is put on the cable 12 and it is drawn away from the lever 14, the cable section 20 will be taken up and tension will be put on the spring 22 until the cable in section 20 is taut.

A cane-type handle 24 is attached to a shaft 26 which is slidable in guides 28 and 30 attached to a fixed portion of an automobile. The shaft 26 has a segmented portion in which is disposed a series of teeth 32. These teeth 32 are ratchet teeth arranged to cooperate with a pawl 34 pivotally mounted at a point 36 on a fixed portion of the vehicle and designed to provide a holding means for the parking brake during the operation thereof.

A sector gear 38 is pivotally mounted to a movable portion of the assembly at point 40 and includes a series of peripheral teeth 42 adapted to engage a series of teeth 44 formed as a portion of a rack 46 attached to a fixed portion of the vehicle. The cable 12 is pivotally attached to the sector gear at point 48.

A shaft 50 carrying a mounting bracket 52 is effectively an extension of the shaft 26 and is keyed through the guide 30 so as to be non-rotatable with respect thereto. A spring 53 is attached on one end to a point 48 where the cable 12 is pivotally attached to the sector gear and is attached on another end at point 54 to the bracket 52 and serves to bias the sector gear 38 toward the shaft 26 against a sector gear stop 56.

The shaft 50 has an outwardly projecting lug 58 which cooperates with a slot 60 peripherally formed on the shaft 26. The peripheral slot 60 is formed in a portion 62 which is an enlarged extension of the shaft 26. It therefore becomes possible for the cane-type handle 24 to be rotated along with the shaft 26 which causes the shaft 26 to be rotated with respect to the shaft 50. As previously stated, the shaft 50 is keyed to the guide 30 and is non-rotatable with respect thereto and, hence, the bracket 52, carried by the shaft 50 which in turn carries the sector gear 38, will be non-rotatable with respect to the shaft 26. As the shaft 26 is rotated, the slot 60 will cooperate with the lug 58 to provide an amount of movement which will free the teeth 32 of the segmented portion of the shaft 26 from engagement with the pawl 34, thereby providing a release means when the holding means has engaged the shaft during an actuation of the parking brake.

In operation, when it is desired to actuate the vehicle parking brake, hand pressure is exerted against the cane-type handle 24 and the handle is pulled leftwardly as viewed in FIGURE 3 away from the guide 28. As previously stated, there is a slack in the cable at section 20 which is contained by the spring 22. During the initial portion of the movement of the handle 24, the slack is taken up and the spring 22 is extended into a position as illustrated in FIGURE 3. As the handle 24 is pulled further, the cable 12 becomes taut and pressure is exerted against the return springs tending to center the brake shoes 16. During this period of movement, the sector gear stop 56 will rise off the shaft 26 and the sector gear assembly will assume the position as shown in FIGURE 3. That is, a tooth 42 of the sector gear 38 engages one of the teeth 44 of the rack 46. A levering action is set up and an increased mechanical advantage of approximately three-to-one is established. This three-to-one mechanical advantage creates a force multiplication for operation of the handle 24. The return springs of the vehicle brake are put under tension and the vehicle brake shoes are separated, utilizing this three-to-one mechanical advantage. It is understood that a three-to-one mechanical advantage is used in the illustration, but any mechanical advantage could be designed into this system for a particular installation requirement.

Referring now to FIGURE 4, the handle 24 is illustrated as having been pulled further than shown in FIGURE 3 and it will be noted that the sector gear 38 has more of the teeth 42 engaging the teeth 44 of the rack 46. It should likewise be noted that the point 48 where the cable 12 is pivotally mounted on the sector gear 38 is moved closer to the rack 46 and, therefore, an increased mechanical advantage is now possible by means of the lever arm established between the point 40 and the point 48 relative to the distance between point 48 and the rack 46. In the illustration in FIGURE 4, approximately a ten-to-one mechanical advantage is possible and the system is designed so that this mechanical advantage is available when sufficient cable pull has resulted to drive the brake shoes 16 into engagement with the rotatable drum 18. It is understood that the friction material on the brake shoe 16 is substantially incompressible and, once contact is made, a stretching of the cable 12 is the only further movement required to lock the brake shoe 16 with respect to the drum 18. The adjustment of the brake 16 relative to the drum 18 will determine the exact amount of movement necessary but it is designed to occur near the point where the maximum mechanical advantage is available. Many present day vehicles have automatic brake adjusting means so this maximum mechanical advantage point will usually be available at the time the brake shoes contact the drum.

Referring now to FIGURE 5, in the event the brake shoe adjustment is not proper and further travel of the brake shoes is required, the handle 24 is continually pulled and the sector gear will ride further along the rack 46. However, the point 48 in its travel will move further away from the sector gear 38 as viewed in FIGURE 5 and, therefore, a decreasing mechanical advantage becomes available to the operator pulling the handle. This decreasing mechanical advantage is important in that a "strong arm" operator will be alerted to the fact that excessive pressure is being exerted on the mechanism. It is apparent that, if the pull on the handle 24, under the circumstances just recited, continues, eventually a one-to-one mechanical advantage will result and excessive force will be required to further move the handle, thereby discouraging an operator from continuing to pull. The system described can also be made so that the handle pull is limited by an interference established between the guide 28 and the enlarged portion 62 at one extreme of travel.

As the handle 24 is pulled to actuate the brake, the pawl 34 pivoting on the point 36 follows the shaft 26 on the ratchet teeth 32. When pressure is released from the handle 24, the pawl 34 engages one of the ratchet teeth 32 and will maintain the handle 24 in that position. In this manner, the brake is maintained energized and can, therefore, be used as a parking brake for a vehicle. When it becomes desirable to disengage the brake, the handle 24 is rotated until the teeth 32 are rotated out of engagement with the pawl 34 and the pawl 34 rides on the smooth portion of the shaft 26. During this period of time, the peripheral slot 60, carried by the enlarged portion 62, will ride around the lug 58 allowing the shaft 50 to remain stationary during the rotational movement of the shaft 26. As the handle 24 is moved rotationally, the spring 53, the return springs 17 in the braking system and the spring 22 will combine to produce a pressure on the shaft 26 and the shaft 50 to push the shafts 50 and 26 rightwardly as viewed in the figures. It should be noted that the spring 53 maintains a bias on the sector gear 38 throughout the movement of the sector gear and continually urges the sector gear in the direction of the shaft 26. The handle 24 will therefore be drawn back toward the guide 28 until all the forces on the braking system and on the cable are released. In the embodiment shown, the handle 24 can be manually rotated to a poised position, but it is understood that a spring arrangement could be incorporated into the system whereby the handle 24 would be automatically centered so that the pawl 34 again engages the teeth 32 on the segmented portion of the shaft 26.

The parking brake mechanism herein recited has utility on any vehicle having a braking system involving expandable shoes driven into engagement with a rotatable drum. When the word "vehicle" is used in the specification, it is meant to include automobiles, trucks or any mechanism having brake shoes of the type described that are used to prevent the rotation of an opposed member. It is obvious that the utility of this device could be extended to any rotatable member that is braked by a frictional member being moved from a poised position into an engaging position with the rotatable member. It is likewise obvious that any kind of a warning device could be incorporated into the system whereby a light or other indication could be given to an operator of the vehicle that the point of pull providing maximum mechanical advantage was reached during rotation of the sector gear and further actuation would be warned against.

It is likewise obvious that the enlarged portion 62 illustrated in the drawings will eventually contact the edge of the guide 28 and will act as a limiting device for the pull on the handle 24. The system may be readily designed so that the enlarged portion 62 contacts the guide 28 at a time when the maximum mechanical advantage is reached, or at any other time that may be deemed desirable in a given installation.

While the embodiment of the present invention, as herein disclosed, constitutes a preferred form, it is to be understood that other forms might be adopted.

What is claimed is as follows:

1. A vehicle parking brake actuating mechanism for a vehicle braking system having a hydraulic and mechanical operation capability, said actuating mechanism comprising: a cable adapted to actuate the vehicle brakes by mechanical means, said cable having a slack portion arranged to follow the vehicle brakes during hydraulic operation; actuator means slidably disposed on a fixed portion of the vehicle; force multiplying means carried by said actuator means and including a floating pivot lever for taking up the slack in the cable and to draw the cable tight to actuate the vehicle brakes, said actuator means having a portion adapted for hand gripping whereby a manual pull will draw the cable tight and actuate the vehicle brakes; and holding means to maintain the actuator means in one extreme of sliding movement after the vehicle brakes have been actuated, said actuator means being axially rotatable to disengage the holding means to allow the actuator means to return to a poised position at another extreme of sliding movement.

2. A vehicle parking brake actuating mechanism according to claim 1 wherein the floating pivot lever is a sector gear pivotally mounted on said actuator means and adapted to be brought into engagement with a rack fixedly positioned with respect to the vehicle brakes, said cable being pivotally attached to said pivotable sector gear at a point nearer the gear teeth than the pivotal mounting of the gear thereby establishing a mounting which causes a varying multiplication of force on the cable as the actuator means is pulled toward one extreme of movement.

3. A vehicle parking brake actuating mechanism according to claim 2 wherein the pivotal attachment of the cable to the sector gear is at least ten times closer to the end of the nearest gear tooth than to the pivotal mounting of the sector gear to the actuator means thereby establishing at least a ten-to-one mechanical advantage between the actuator means and the cable at one point in the sliding movement of the actuator means.

4. A vehicle parking brake actuating mechanism according to claim 1 wherein the actuator means is a cane type shaft slidable in a plurality of guides mounted on a fixed portion of the vehicle, said cane type shaft being axially rotatable with respect to the force multiplying means while slidably disposed in said guides.

5. A vehicle parking brake actuating mechanism according to claim 1 wherein the holding means is a pawl pivotally carried in fixed relationship with respect to the actuator means in juxtaposition to a series of ratchet teeth formed in a segmented portion of the actuator means, said pawl overlaying the ratchet teeth during retraction of the actuator means and arranged to engage one of the ratchet teeth whenever the sliding actuator means is released after having been pulled.

6. A vehicle parking brake actuating mechanism according to claim 1 wherein the slack portion of the cable is maintained between the ends of a spring, said spring serving to keep the cable taut while the actuator means is in a poised disposition, said slack portion of the cable allowing the cable to follow the brake shoes during hydraulic operation of the vehicle brakes.

References Cited by the Examiner

UNITED STATES PATENTS

| 1,500,217 | 7/1924 | Andersson | 74—516 |
| 1,926,174 | 9/1933 | Reilly et al. | 74—516 |
| 2,672,057 | 3/1954 | Bratz | 74—501 |
| 2,682,178 | 6/1954 | Powell | 74—503 |

FOREIGN PATENTS

| 444,778 | 5/1927 | Germany. |
| 804,515 | 4/1951 | Germany. |

FRED C. MATTERN, Jr., *Primary Examiner.*

C. F. GREEN, *Assistant Examiner.*